June 27, 1961 C. FIELD 2,990,199
ICEMAKING AND CONGEALING APPARATUS AND METHOD
Filed March 6, 1957 8 Sheets-Sheet 1

INVENTOR.
CROSBY FIELD
BY
Curtis, Morris & Safford
ATTORNEYS

June 27, 1961  C. FIELD  2,990,199
ICEMAKING AND CONGEALING APPARATUS AND METHOD
Filed March 6, 1957  8 Sheets-Sheet 2

INVENTOR.
CROSBY FIELD
BY
Curtis, Morris & Safford
ATTORNEYS

June 27, 1961 C. FIELD 2,990,199
ICEMAKING AND CONGEALING APPARATUS AND METHOD
Filed March 6, 1957 8 Sheets-Sheet 3
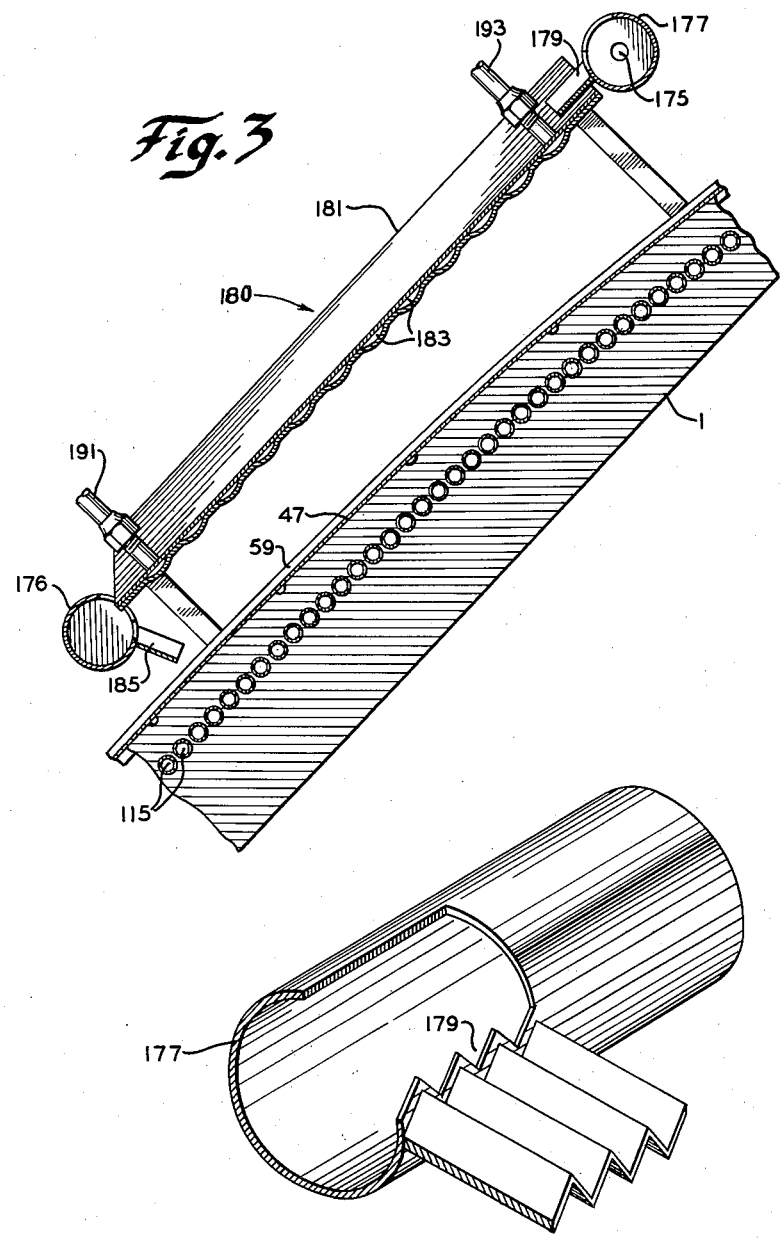
INVENTOR.
CROSBY FIELD
BY
Curtis, Morris & Safford
ATTORNEYS June 27, 1961      C. FIELD      2,990,199
ICEMAKING AND CONGEALING APPARATUS AND METHOD
Filed March 6, 1957      8 Sheets—Sheet 4
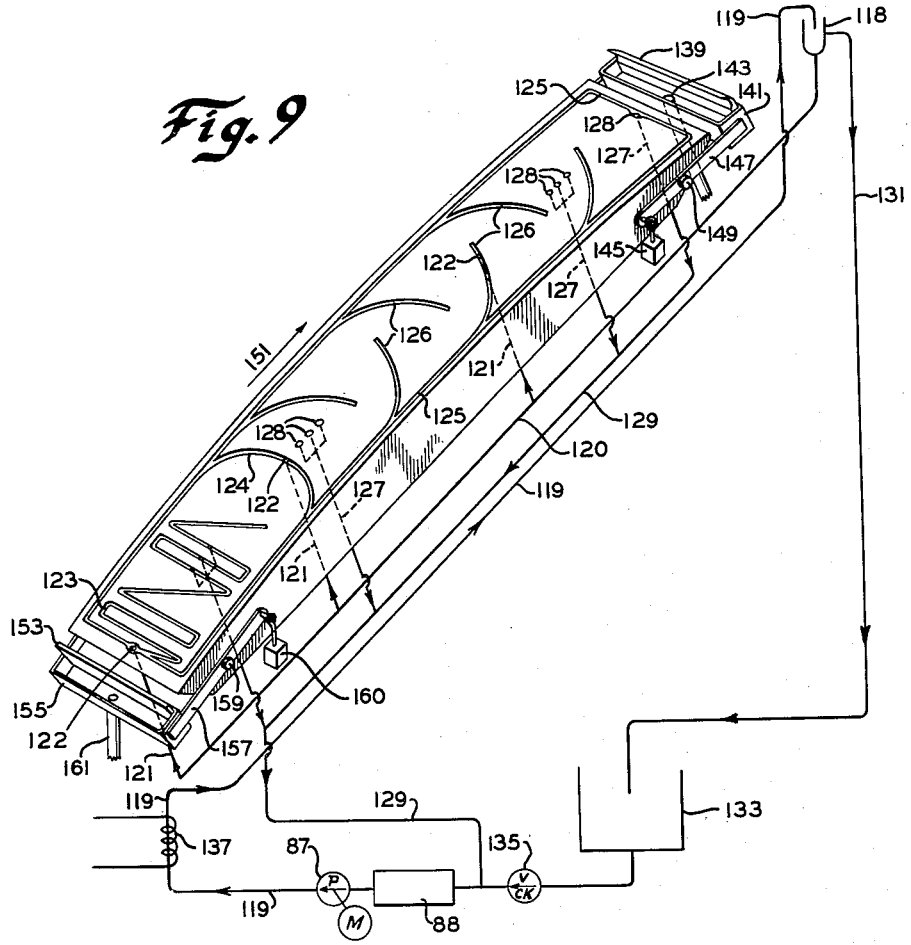
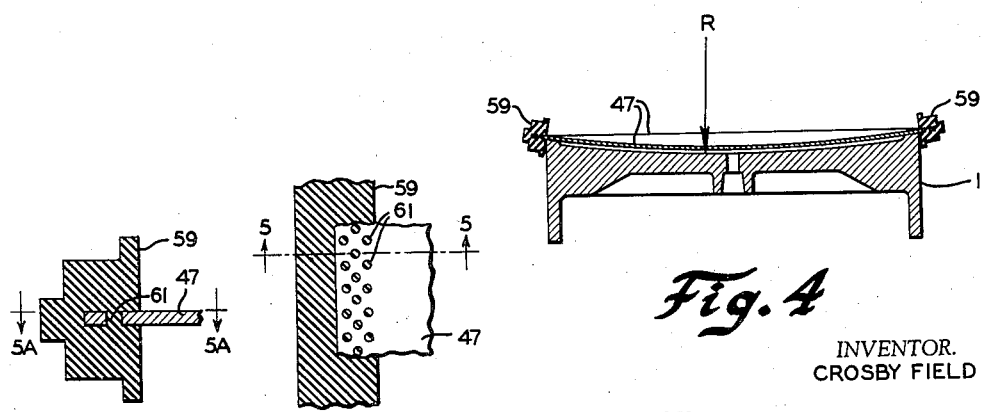
INVENTOR.
CROSBY FIELD
BY
Curtis, Morris & Safford
ATTORNEYS

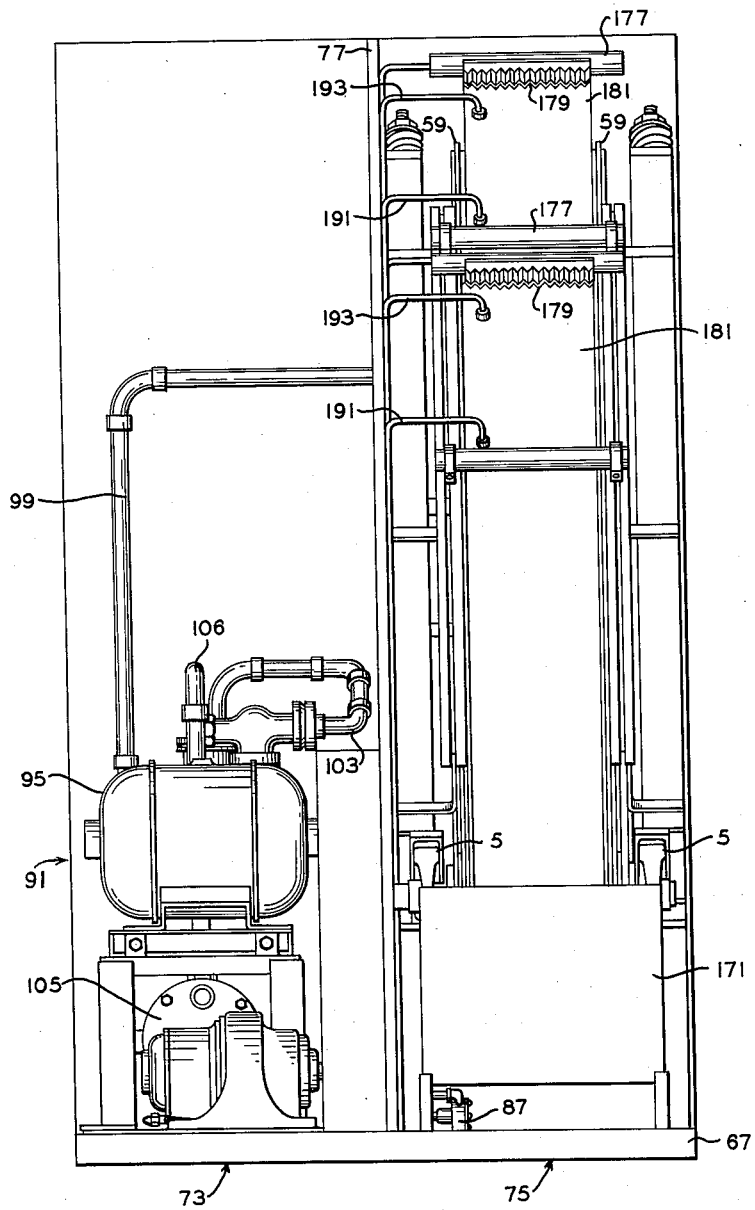

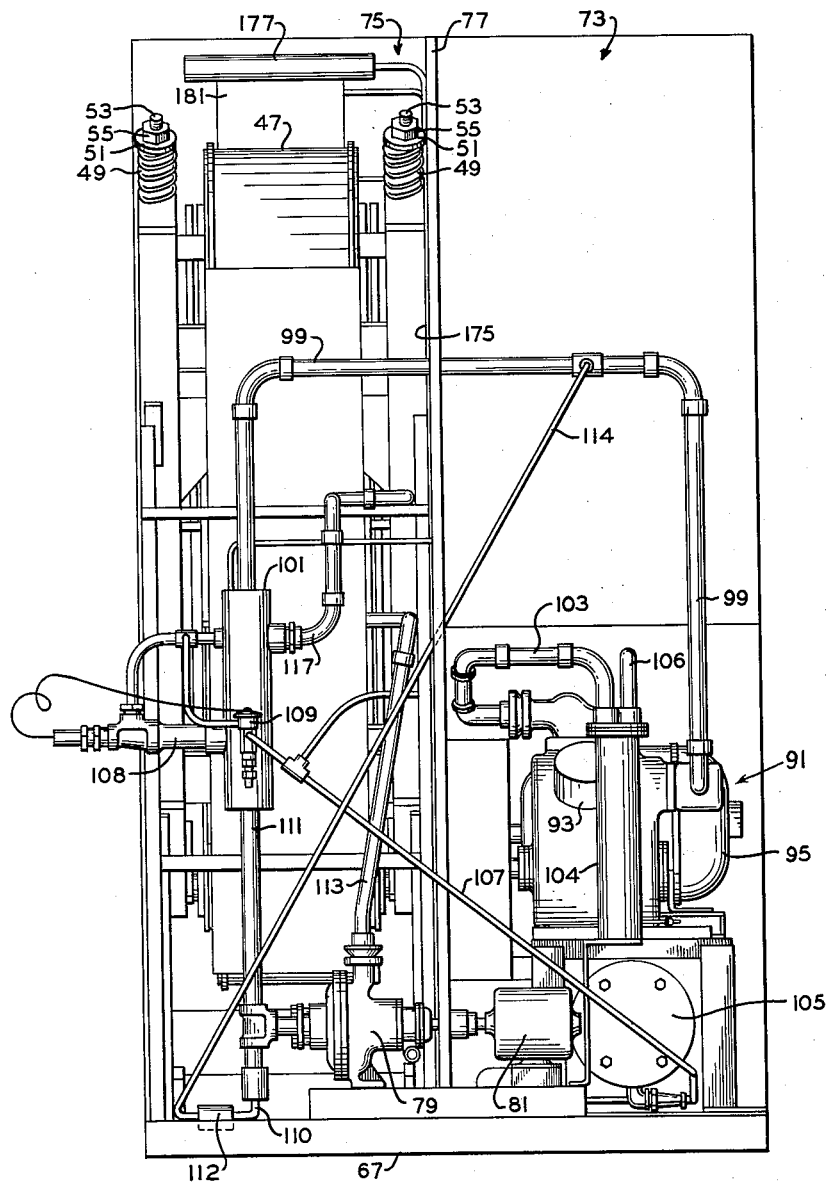

June 27, 1961  C. FIELD  2,990,199
ICEMAKING AND CONGEALING APPARATUS AND METHOD
Filed March 6, 1957  8 Sheets-Sheet 7
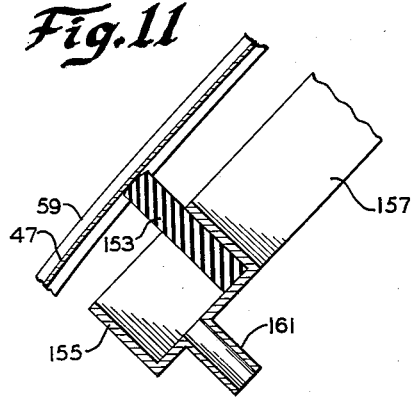
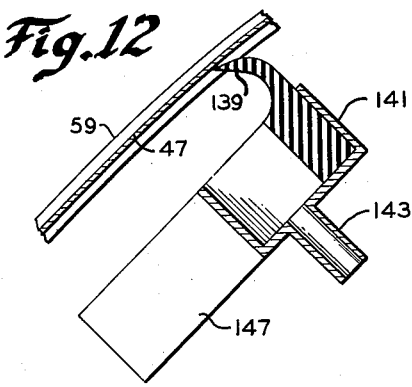
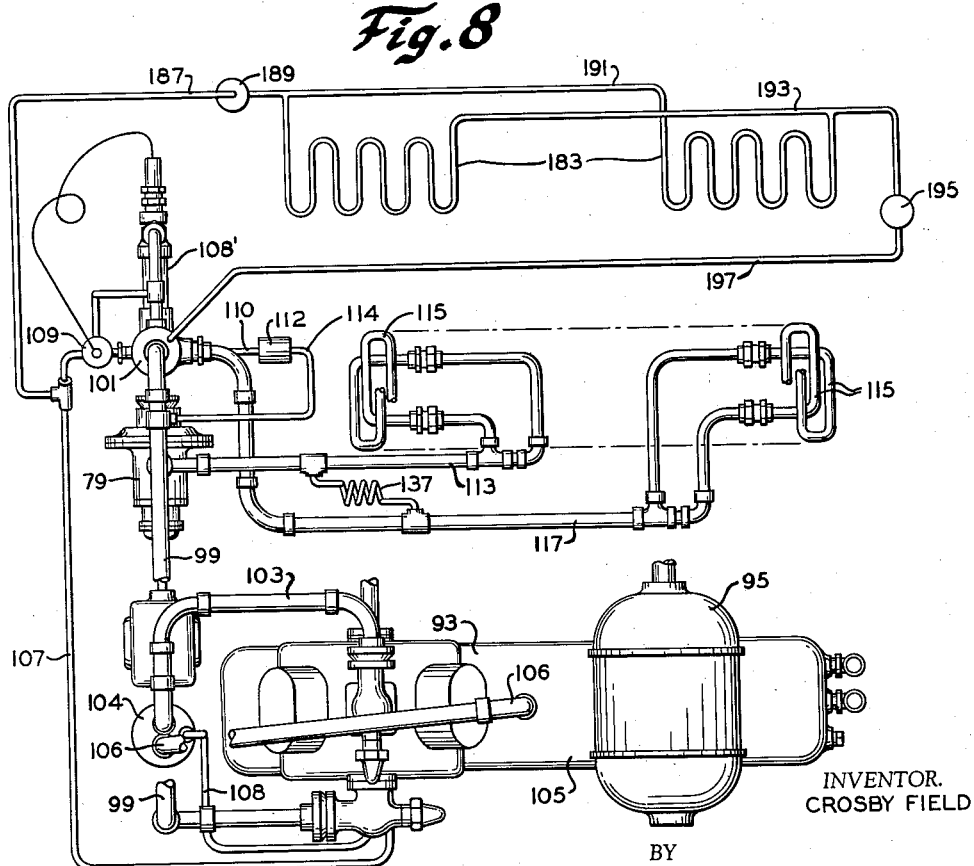
INVENTOR.
CROSBY FIELD
BY
Curtis, Morris & Safford
ATTORNEYS June 27, 1961 C. FIELD 2,990,199
ICEMAKING AND CONGEALING APPARATUS AND METHOD
Filed March 6, 1957 8 Sheets-Sheet 8

INVENTOR.
CROSBY FIELD
BY
Curtis, Morris & Safford
ATTORNEYS

United States Patent Office 2,990,199
Patented June 27, 1961

2,990,199
ICEMAKING AND CONGEALING APPARATUS AND METHOD
Crosby Field, Brooklyn, N.Y., assignor to Flakice Corporation, Brooklyn, N.Y., a corporation of Delaware
Filed Mar. 6, 1957, Ser. No. 644,260
17 Claims. (Cl. 62—72)

This invention relates to the art of congealing, and apparatus for use in connection therewith. Thus, for example, the invention may be used for freezing liquid or solid foodstuffs or for making ice or in general for congealing material to convert it from a liquid state into a solid state. It is an improvement on the inventions disclosed in my U.S. Patents Nos. 2,610,474 and 2,610,476 issued September 16, 1952.

One of the objects of this invention is to provide new and improved freezing apparatus. Another object is to provide a new and improved ice making evaporator, which may be readily incorporated into a "packaged unit" containing both the ice maker and the ancillary refrigerant condensing unit. Another object of this invention is to provide an ice maker which after making the ice will convey it to a height permitting discharge into a storage bin resting on the same platform as the ice maker. Other objects will be in part obvious and in part pointed out hereinafter.

Referring to the drawings, in which is shown a congealing machine or unit which is one embodiment of the present invention:

FIGURE 1 is a side elevation of the unit showing the equipment on the evaporator side of a vertical insulating partition;

FIGURE 1-A is a sectional view of the lower portion of the unit, showing the mounting for the lower end of the belt;

FIGURE 3 is a vertical sectional view of the upper portion of the evaporator and the associated parts, including one of the water distributors;

FIGURE 4 is a transverse section of the evaporator plate and the belt;

FIGURE 5 is an enlarged sectional view of the edge of the belt on the line 5—5 of FIGURE 5-A.

Figure 13:
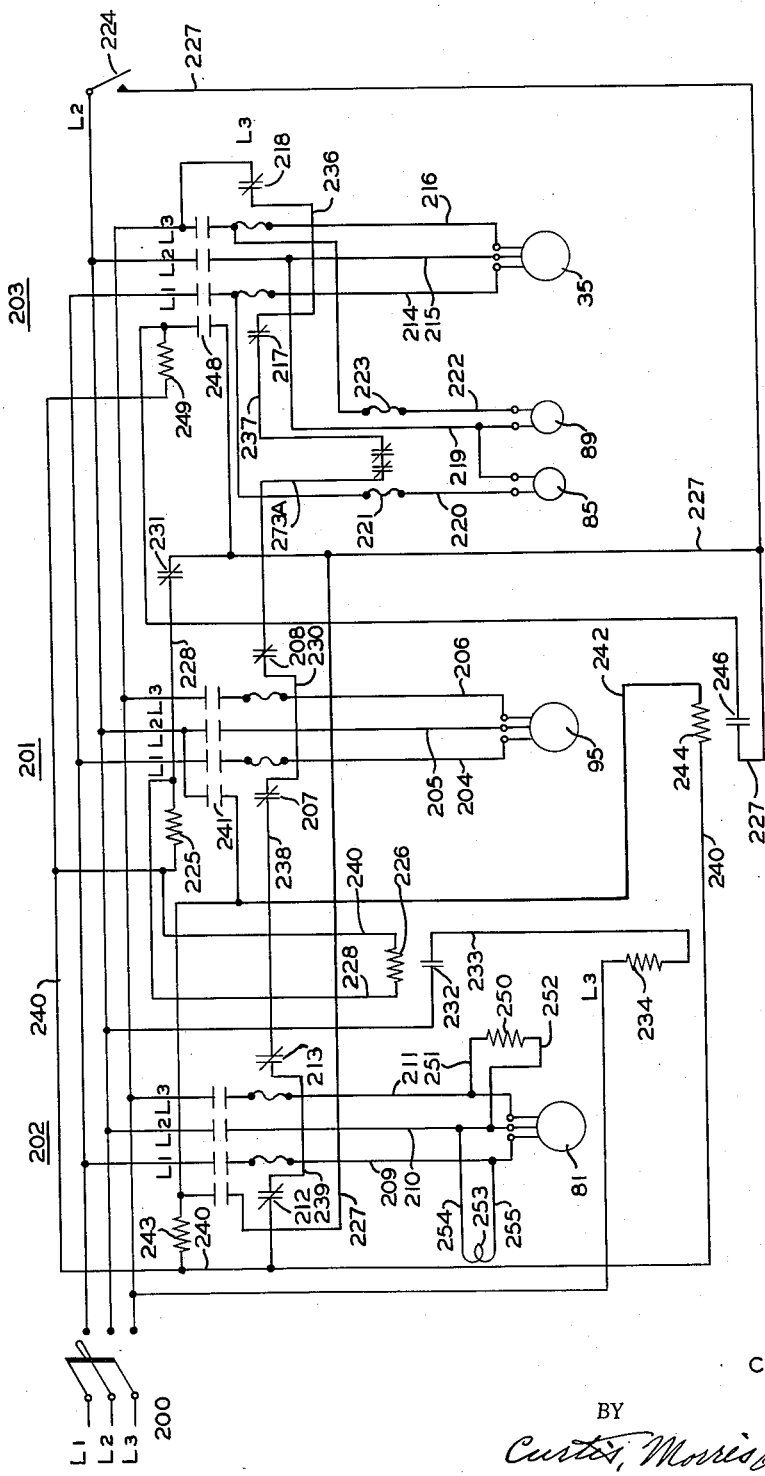

FIGURE 5-A is a sectional view on the line 5-A—5-A of FIGURE 5;

FIGURE 6 is a front elevation of the unit;

FIGURE 7 is a rear elevation of the unit;

FIGURE 8 is a top plan view of the refrigeration system, with the parts represented somewhat schematically and with parts rearranged for clarity of showing;

FIGURE 9 is a schematic representation of a system for circulating heat transfer and lubricating liquid, and showing the evaporator and associate parts in perspective;

FIGURE 10 is an enlarged fragmentary view of the upper water distributing header shown in FIGURE 3;

FIGURE 11 is a sectional view for the condensate removing assembly at the lower end of the freezing belt;

FIGURE 12 is a sectional view of the assembly for removing liquid from the under side of the freezing belt; and, FIGURE 13 is a schematic electrical wiring diagram.

In the description below, the liquid being congealed is referred to at times as "water" and the products are called "ice," and the congealing operation is referred to at times as "freezing." Except where specifically indicated, these references to "water," "ice" and "freezing" are illustrative only, and are not limiting; it will be understood that other liquids may be congealed so as to produce other products than "ice," and that the circulation and handling operations are similar. The machine is enclosed in an insulated casing which is omitted in the drawings.

Figures 1, 1A:
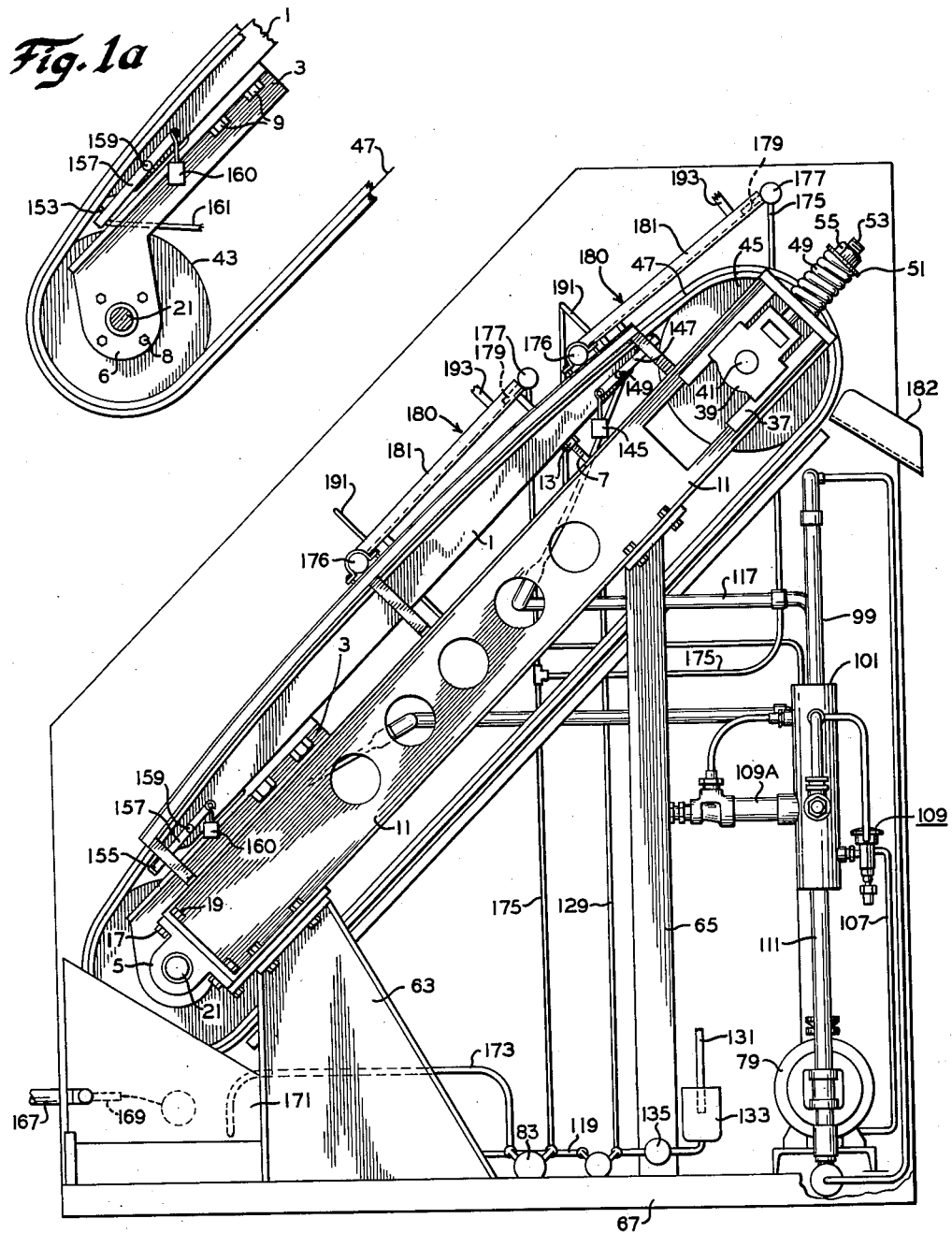

Referring particularly to FIGURE 1, the congealing machine includes an evaporator 1 which is mounted at its lower end (see FIGURE 1-A) through a bracket 3 attached to the evaporator by screws 9 and mounted upon a drive shaft 21 by a bearing 6 fastened to the bracket by screws 8. Shaft 21 is mounted at its ends in a pair of bearings 5 (FIGURE 1), each of which is clamped to a rigid side frame member 11 by a pair of bolts 17 and nuts 19. The side frames 11 are supported at their lower ends by a pair of feet or base brackets 63 and at their upper ends by a pair of vertical posts 65, brackets 63 and posts 65 all being fixed to the base frame 67.

As indicated above, evaporator 1 is mounted by brackets 3 upon shaft 21, and it may swing about the axis of this shaft. The upper end of the evaporator is adjustably supported by a pair of bolts 7 mounted respectively upon the side frame members 11 and each bolt is fixed in a hole in the evaporator and locked in place by a lock nut 13. In this way, the evaporator is rigidly supported but it may be swung up and down by adjustment of the nuts on bolt 7. Extending along the upper surface of evaporator 1 is an endless steel belt 47 which provides the freezing or congealing surface upon which water or other liquid is congealed. A lubricating and heat transfer liquid or viscous fluid is provided between the coextensive upper surface of the evaporator and the under surface of belt 47 so as to insure a high rate of heat transfer from the liquid on the belt through the belt and to the refrigerant in the evaporator.

Figure 2:
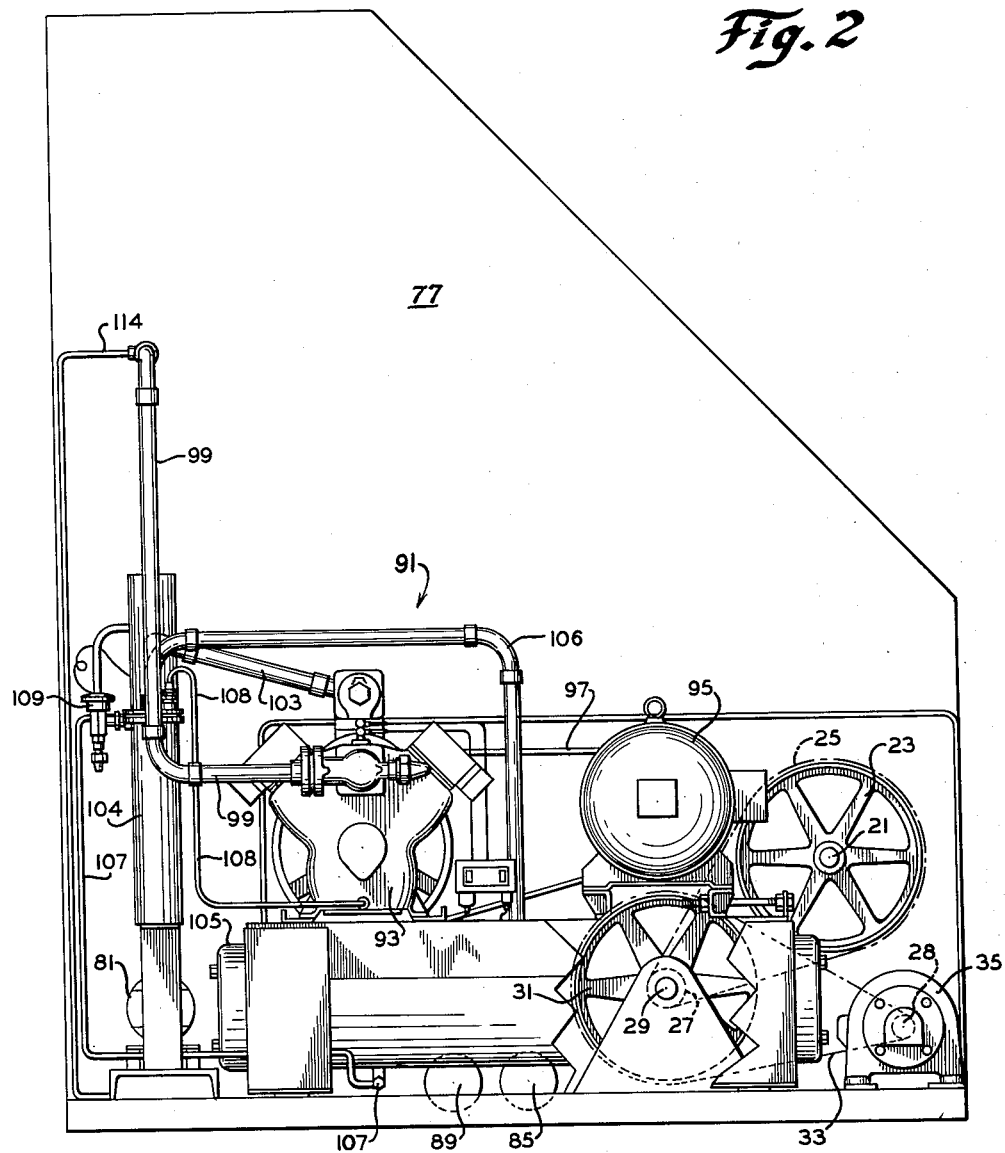
FIGURE 2 is a side elevation of the unit showing the equipment on the compressor or condensing unit side of the insulating partition.

Belt 47 is supported at its lower end by a lower pulley or drum 43 mounted upon and keyed to shaft 21, and a similar upper drum 45 mounted upon a shaft 41. Shaft 41 is mounted at its ends in a pair of bearings 39, each of which is supported in a pair of slides 37 mounted upon and parallel to the side frame member 11. Referring to FIGURE 2, shaft 21 is rotated through a sprocket wheel 23 keyed to the end of the shaft, a sprocket chain 25 and a sprocket wheel 27 mounted upon and keyed to a shaft 29. Shaft 29 is, in turn, driven through a sprocket 31 by a sprocket chain 33 from a sprocket 28 of a drive motor 35. Thus, when the motor is operating, the belt 47 is driven through the pulley or drum 43 so that the upper run of the belt moves upwardly along the surface of evaporator 1.

Sufficient tension is maintained upon the belt to insure the proper drive and operating relationship by a pair of springs 49, each of which acts through a threaded rod 53 to hold the sliding bearing 39 of shaft 41 upwardly in the slides 37. Each of springs 49 rests against a plate on the end of its side frame member 11, and the compression of the spring is adjusted by a nut 55 acting against a washer 51. Hence, the tension of the belt can be readily adjusted by turning the pair of nuts 55. The upper surface of the evaporator is curved concavely transversely of the evaporator, and this curvature is shown greatly exaggerated in FIGURE 4, with the curvature being represented as having a radius "R." During operation, this curvature insures that the coextensive evaporator and belt surfaces are sealed together so as to maintain the vacuum condition therebetween, as discussed below. At each edge of the belt 47, there is a rubber flange strip 59 (see also FIGURES 5 and 5-A) which is bonded to the edge of the belt through perforations 61. The lower flanges of these flange strips 59 (FIGURE 4) move along the vertical sides of the evaporator, and the upper flanges of these flange strips provide side dams for the liquid on the upper surface of the belt. These lower flanges seal the edges of the space belt and the evaporator, and they also assist in guiding the belt in its upper movement along the evaporator. The upper surface of the evaporator is generally bow-shaped, that is, it has an upward convex curve from end to end, as viewed in FIGURE 1, and this curvature is such that the belt 47 adapts itself to the evaporator surface and moves along it.

Water or other liquid to be congealed is supplied to the freezing surface of the belt by a pair of identical precooling and distributing units 180, the details of which are shown in FIGURES 3 and 10. Water is supplied to a cylindrical header 177 (FIGURE 10) from which it flows through a large number of weirs 179 formed by V-notches and a plate connected thereto. The water or other liquid is thus deposited in an even distribution into the upper end of a forecooler or precooler plate 181 which is an evaporator plate with refrigerant passageways forming an evaporator section 183. The liquid is precooled while flowing down this plate and, at the bottom edge of the plate, it flows into a header 176 which is identical with header 177, and from which the water flows through weirs 185 onto the surface of the freezing belt. The distribution is such that a flowing stream of liquid to be congealed covers the entire surface of the belt throughout the area of its contact with the evaporator. The rate of freezing and the rate of movement of the belt is such that a layer of the congealed product, such as ice, of the desired thickness is formed on the belt surface by the time that the surface reaches the upper end of the evaporator. This congealed layer of the desired thickness has then moved above the zone where the belt is supplied with the liquid to be congealed, and the congealed product is sub-cooled so that it is dry. As the belt starts to move around the curvature formed by the upper pulley or drum 45, the congealed layer peels from the belt, and it falls into a discharge chute 182 for delivery to a storage bin or for immediate consumption. When the product being congealed is of a character that it does not peel from the freezing surface readily, it may be assisted by other means.

The liquid to be congealed is supplied to the headers 177 through distributing pipes 175 from a pump 83 which draws the liquid from a sump tank 171. The sump tank 171 is positioned beneath the lower end of the belt so that it receives the unfrozen liquid which runs down from the bottom of the freezing surface. Additional liquid is supplied through a pipe 167 under the control of a float valve 169. Under some circumstances, the sump tank may be used to purge uncongealed liquid, or to remove the uncongealed liquid. In such case, the fresh or additional liquid to be congealed may be supplied directly to the distribution headers.

As indicated above, a medium is provided to insure a high rate of heat transfer between the evaporator and belt 47, and in the illustrative embodiment this medium is a liquid in the form of a glycol. This liquid is circulated by a pump 87 which also cooperates with the seal along the edges between the evaporator and the belt and the several suction openings 128 to create a partial vacuum between the coextensive surfaces of the evaporator and the belt. Hence, the glycol provides a somewhat floating seal between the surface and the partial vacuum condition holds the surface in heat exchange relationship. The glycol circulating system and the arrangement for providing this partial vacuum condition are best understood by referring to FIGURE 9. The upper surface of evaporator 1 is provided with grooves in the pattern shown, with there being a peripheral groove 125, interconnecting transverse grooves 123, a transverse curved groove 124, and six curved grooves 126 extending from groove 125 at the sides of the evaporator.

The liquid from pump 87 flows through a line 119 and is precooled by passing it in heat interchange relationship with an evaporator coil 137 of the refrigeration system. The cold liquid is discharged into a funnel 118 where air is permitted to escape, and the liquid then flows by gravity through a line 120 and three distribution lines 121, to liquid supply openings 122 in the grooves 124, 125, and 126. The liquid spreads from these openings throughout the width of the belt, and is carried along the freezing zone by the movement of the belt. Suction openings 128 are also provided centrally of the belt and at the upper end of the belt in groove 125, and these suction openings are connected through lines 127 to a suction line 129 which extends to a reservoir 88 at the suction side of the pump. The pump is effective to maintain a partial vacuum condition throughout the surface of the evaporator, and some liquid is constantly drawn back to the pump. There is also some leakage of air, so that air passes to the pump with the liquid.

As indicated above, the liquid and air are discharged into funnel 118 and there the air separates from the liquid. Line 120 is maintained full of liquid at all times, and any excess liquid which is pumped to the funnel flows through an overflow line 131 to a reserve liquid tank 133. The suction side of the pump is connected to tank 133 through a check valve 135 which opens when the supply of liquid from line 129 is insufficient to satisfy the demands of the pump. During normal operation, the pump circulates an excess of liquid, and this excess flows back to the reserve tank.

The liquid in the reserve tank also supplies the make-up liquid to replace liquid which is not returned from the evaporator surface. That is, during operation, some of the liquid adheres to the belt as the belt moves away from the evaporator, and this liquid may become contaminated with condensate water or other foreign fluids. Accordingly, this liquid is collected and discarded by a scraper 139 (see also FIGURE 11) which acts as a squeegee, and thoroughly cleans the under surface of belt 47 immediately after the belt leaves the evaporator. This scraper also removes any solid particles which might otherwise pass between the belt and the upper drum or roller 45. The materials thus collected by the scraper pass into a tank or receptacle 141, and are discharged to waste at 143. The entire scraper and tank assembly is supported upon a pair of lever arms 147 which are pivoted at 149, and are provided with counterweights 145. This provides the desired contact pressure between the scraper and the belt, and the pressure may be adjusted by adding or removing weights at 145. At the bottom of the belt, there is a somewhat similar scraper arrangement (see also FIGURE 11) formed by a cloth pad 153, a receptacle or tank 155, and a discharge pipe 161. This unit is supported by a pair of lever arms 157 pivoted at 159 and having counter weights 160. This scraper or wiper 153 removes condensate or any other foreign materials from the belt prior to the entry of the belt into the freezing zone. In this way, the coextensive surface of the evaporator and the belt remain free of all foreign matter.

As indicated above, the unitary machine which is the illustrative embodiment of the invention is enclosed within a casing which is divided by the central partition 77 into the evaporator or ice-making section of compartment 75 (FIGURE 6) at the right, and the condenser section or compartment 73 at the left. The condenser unit 91 within compartment 73 (FIG. 2) includes a compressor 93 driven by a motor 95 through a belt 97 and having a refrigerant inlet or suction line 99 and a discharge line 103 (see also FIG. 8). Discharge line 103 extends to an oil separator 104 where the oil is separated, and the compressed refrigerant then flows through a line 106 to a condenser-receiver 105. The separated oil is returned to the crank case of the compressor through a line 108.

The liquid refrigerant flows through a line 107 and an expansion valve 109 to a refrigerant surge drum 101 (see the right-hand portion of FIG. 1). Surge drum 101 is connected at the bottom through a line 111 to the suction side of a refrigerant circulating pump 79, the discharge side of which is connected through a line 113 to the evaporator coils 115 which are embedded in the evaporator 1 (see also FIGURE 3). These coils 115 are connected in two parallel circuits (FIGURE 8), the other side of which are connected through a line 117 back to the surge drum 101. Hence, the evaporator coils are continuously supplied with liquid refrigerant.

Connected in parallel with coils 115 between lines 113 and 117 is the fluid cooling coil 137 discussed above, which cools the glycol fluid leaving pump 81. The suction side of the compressor is connected to the top of the surge drum 101, thus to draw refrigerant gas back to the compressor. A line 110 bleeds a small stream of liquid from line 111 back to the suction line of the compressor so as to prevent the accumulation of oil in the surge drum. This liquid is superheated in a heat exchanger 112 by passing it into heat exchange relationship with hot refrigerant. Within the surge drum, the liquid falls to the bottom and is recirculated by the refrigerant pump, while the gas or vapor refrigerant is drawn back to the compressor. The level of liquid refrigerant is maintained constant by the control valve 109 which has its sensing bulb inserted in a well 108' in the surge drum.

Liquid refrigerant for the precooler or forecooler plates 181 is withdrawn from the liquid refrigerant line 107 through a line 187 and passes through an expansion valve 189 and a line 191 to the evaporator sections 183. The other side of each of these sections is connected to a line 193 which is connected through a back pressure valve 195 and a line 197 to the top of the surge drum. The back pressure valve 195 maintains a sufficient refrigerant pressure in line 193 and the evaporator sections 183 to prevent the freezing of water on the plates 181.

The schematic representation of the electrical circuit in FIGURE 13 will now be described, with it being understood that an attempt has been made to use conventional representations and showings. With this electric circuit, the operation is automatic at all times. Power is supplied to the unit through lines L1, L2 and L3 from a 220 volt, three-phase, 60 cycle supply through a main disconnection switch 200, and thence to motor controllers 201, 202 and 203. Lines 204, 205 and 206 connect motor 95 to its controller 201 through thermal overload relays 207 and 208. Lines 209, 210 and 211 connect motor 81 to its controller 202 through thermal overload relays 212 and 213. Lines 214, 215 and 216 connect motor 35 to its controller 203 through thermal overload relays 217 and 218. Line 219 connects one leg of each of the single phase motors 85 and 89 to terminal L2 of controller 203. Line 220 connects the other leg of motor 85 to the line side of the header of the relay 217 through the thermal overload relay 221. Line 222 connects the other leg of motor 89 to the line side of the heater of relay 218 through thermal overload relay 223.

To start the unit, the main switch 200 is first closed, and then the snap switch 224 is closed. The closing of the snap switch energizes holding coil 225 of controller 201, and also coil 226 of the time delay relay that operates the unloading valve of the compressor. These coils are connected in parallel by lines 228 and 229. Line L3 is connected through normally closed contacts of relay 218; line 236, normally closed contact of relay 217; line 237, normally closed contact of relay 208; line 230, normally closed contact of relay 27; line 238, normally closed contact of relay 213; line 239, normally closed contact of relay 212; and line 240 which connects to one leg of each of the holding coils of motor controllers 201, 202 and 203. The reason for this interconnection of the motor controller is to cause all motors to shut down in case of an overload on any motor. Snap switch 224 connects line L2 to line 227. Normally closed contact 231, on high-low pressure switch of the compressor, connects line 227 to line 228 which completes the circuit to coils 225 and 226.

Coil 225 closes motor controller 201 starting motor 95 which will continue to operate until 201 is again opened. It will automatically cut in and out with the opening and closing of contacts 231 on the high-low pressure switch.

After the coil 226 on the time delay relay has been energized for a predetermined time, the normally open contact 232 will close connecting L2 to line 233, which is connected to one leg of coil 234, and the other leg of 234 is connected to line L3. This completes the circuit to this coil which closes the normally open unloading valve, the closing of this valve throws full load on the compressor.

Normally open contact 241 on motor controller 201 connects line L2 to line 242 when 201 closes. This energizes coils 243 and 244, as the other leg of each of these coils is connected to line 240. Coil 243 closes motor controller 202 which starts the refrigerant recirculating pump motor 81. This motor will continue to run until the circuit to coil 243 is opened either by overload relays or by the opening of switch 224, because the holding contact 245 will prevent controller 202 from opening when controller 201 cycles.

After the coil 244 on the time delay relay has been energized for a predetermined time, contact 246 is closed so as to connect line 227 to line 247 which is connected to one leg of coil 249. This energizes coil 249 as the other leg is connected to line 240. This closes motor controller 203 so as to start motor 35 which drives the belt 47; and so as to start motor 85 that drives the water recirculating pump, and motor 89 which drives the pump for the heat transfer and lubricating fluid. Holding contact 248 will maintain the circuit of coil 249 so as to keep these motors running until the circuit is opened either by opening switch 224 or by an overload on either of the motors which would open one of the overload relays.

Coil 250 operates a normally closed valve in the liquid refrigerant line from the receiver. This coil is connected by lines 251 and 252 to lines 210 and 211 and holds the valve open during the entire time that motor 81 is in operation. The heating element for the control bulb of level control is connected to motor leads 209 and 210 by wires 254 and 255. This heater element 253 will be energized during the entire time motor 81 is in operation.

It has been indicated above that the illustrative embodiment of the invention is adapted to congeal various liquids, and that it is particularly useful in the manufacture of ice. In actual use, the quality of the ice is very satisfactory, and the production rate is high. The invention contemplates manufacturing ice of varying thickness, depending upon the intended use and the conditions of operation. Certain or all of the advantages of the invention are obtained in the congealing of other liquids and the production of products other than ice. It should be noted that the product is discharged at a high level so that it may be received and stored in a bin which is supported upon or above the level of the base of the machine. The machine is self-contained, and installation involves only making the water and electrical connections.

In the present embodiment, glycol is used as the lubricating and heat transfer fluid. Under certain circumstances, highly viscous fluids or pastes may be used which are of more or less a permanent nature, and the fluid circulating mechanism is therefore simplified or eliminated. Under some circumstances, the arrangement for recirculating refrigerant through the evaporator coils may be dispensed with.

As many possible embodiments may be made in the above-invention and as many changes might be made in the embodiments above set forth, it is to be understood

I claim:

1. In congealing apparatus, the combination of, a stationary refrigerated plate having an exposed refrigerated surface, an endless metal belt positioned with a portion thereof extending along said surface in heat exchange relationship therewith throughout an extended heat transfer zone formed by the contacting coextensive surfaces of the belt and said refrigerated surface, means mounting said belt and adapted to move said belt along said surface, and means to maintain a partial vacuum condition in said zone between said belt and said surface whereby intimate heat exchange relationship is obtained.

2. Apparatus as described in claim 1, wherein said means to maintain a partial vacuum condition comprises, means constituting a supply of fluid and means to draw fluid and air from said zone of said freezing surface.

3. Apparatus as described in claim 1, wherein said means to maintain a partial vacuum condition comprises, a liquid circulating system for supplying liquid to said space and for withdrawing liquid and air from said zone and which includes means to separate air from the liquid.

4. Apparatus as described in claim 3, wherein said plate has grooves at substantially the periphery of said surface and transversely of said surface and wherein liquid is supplied to said surface within the zone where the belt moves onto said surface and liquid and air are withdrawn from said surface within the central portion of said surface.

5. Apparatus as described in claim 4, wherein said surface is concave transversely of the path of movement of the belt and is convex along the path of movement of the belt.

6. Apparatus as described in claim 5, which includes a liquid circulating pump and a reservoir for liquid.

7. Apparatus as described in claim 6, which includes means mounting said refrigerated plate and said belt at a substantial angle to the horizontal so that the belt moves upwardly along said refrigerated surface, and means to supply liquid to be congealed to the upper surface of the belt adjacent the upper end of said refrigerated plate.

8. Apparatus as described in claim 7, wherein said means to supply liquid to be congealed includes, liquid circulating means, a weir assembly through which liquid flows, and a liquid precooling plate over which the liquid passes prior to being discharged onto said belt.

9. Apparatus as described in claim 8 which includes, a plurality of liquid distributing and precooling units, each of which flows a stream of liquid to be congealed, and which are positioned to discharge liquid within different zones along said belt.

10. Apparatus as described in claim 9, which includes a plurality of V-notch weirs through which liquid is discharged onto said belt.

11. Apparatus as described in claim 10, which includes a pair of flexible bands attached respectively to the edges of said belt and each forming a protective guard extending downwardly along the side edge of the refrigerated plate and extending upwardly to act as a liquid dam above the surface of the belt.

12. Apparatus as described in claim 11, which includes a refrigeration system of which said refrigerated plate comprises an evaporator section, and a casing which encloses the apparatus with a vertical heat insulated partition having the refrigerated plate and the belt positioned on one side thereof and having the refrigerant condensing equipment positioned on the other side thereof.

13. Apparatus as described in claim 12, wherein said refrigerated plate comprises a plurality of evaporator sections formed by tubes connected in parallel and embedded in cast aluminum.

14. Apparatus as described in claim 13, wherein said refrigeration system includes means to re-circulate refrigerant through said evaporator sections, and individual evaporator sections for precooling the liquid to be congealed and the liquid supplied to the space between said belt and said refrigerated plate.

15. Apparatus as described in claim 14, wherein the apparatus is operated by electricity and which includes an electrical control circuit which provides automatic operation.

16. Apparatus as described in claim 15, wherein the liquid to be congealed is water and the liquid circulated to the space between said belt and the refrigerated plate is a glycol.

17. In the art of congealing liquids, the steps of, flowing the liquid with the aid of gravity along a surface of a flexible belt, providing a seal fluid upon the side of the belt in the space between the belt and a refrigerated surface, maintaining a partial vacuum condition within said space, and moving the belt along said refrigerated surface.

References Cited in the file of this patent

UNITED STATES PATENTS

| | | |
|---|---|---|
| 1,742,194 | Bennett | Jan. 7, 1930 |
| 2,419,954 | Schaal | May 6, 1947 |
| 2,524,815 | Leeson | Oct. 10, 1950 |
| 2,610,476 | Field | Sept. 16, 1952 |
| 2,612,357 | Parks | Sept. 30, 1952 |
| 2,645,092 | Ridnour | July 14, 1953 |
| 2,663,548 | Boling | Dec. 22, 1953 |
| 2,682,155 | Ayres et al. | June 29, 1954 |
| 2,803,950 | Bayston | Aug. 27, 1957 |